(12) United States Patent
Long (10) Patent No.: US 7,003,521 B2
(45) Date of Patent: Feb. 21, 2006

(54) METHOD AND APPARATUS FOR LOCKING OBJECTS USING SHARED LOCKS

(75) Inventor: Dean R. E. Long, Boulder Creek, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 504 days.

(21) Appl. No.: 09/816,010

(22) Filed: Mar. 22, 2001

(65) Prior Publication Data

US 2002/0138544 A1 Sep. 26, 2002

Related U.S. Application Data

(60) Provisional application No. 60/208,026, filed on May 30, 2000.

(51) Int. Cl.
*G06F 17/30* (2006.01)

(52) U.S. Cl. .......................................... 707/8; 707/100

(58) Field of Classification Search .................... 707/2, 707/3, 8, 100; 717/108; 718/104
See application file for complete search history.

(56) References Cited

U.S. PATENT DOCUMENTS

| | | | | |
|---|---|---|---|---|
| 4,249,241 A | * | 2/1981 | Aberle et al. ................... | 707/8 |
| 4,399,504 A | | 8/1983 | Obermarck et al. ......... | 364/200 |
| 5,339,427 A | | 8/1994 | Elko et al. .................... | 395/725 |
| 5,860,070 A | * | 1/1999 | Tow et al. ..................... | 707/8 |
| 5,913,213 A | | 6/1999 | Wikström et al. .......... | 364/200 |
| 6,144,983 A | * | 11/2000 | Klots et al. .................... | 707/8 |

FOREIGN PATENT DOCUMENTS

WO WO 98/44401 10/1998

OTHER PUBLICATIONS

"Thin Locks: Featherweight Synchronization for Java", Bacon et al., ACM Sigplan Notices, Assocation for Computing Machinery, New York, US, vol. 33 No. 5, May 1, 1998, pp. 258-268, XP000766275.
International Serach Report in corresponding PCT application PCT/US01/16411, mailed Jan. 15, 2003.

* cited by examiner

*Primary Examiner*—Sam Rimell
(74) *Attorney, Agent, or Firm*—Beyer, Weaver & Thomas, LLP.

(57) ABSTRACT

Methods and apparatus for a scaleable locking convention are disclosed. According to one aspect of the present invention, a method for acquiring access to an object in an object-based system includes identifying a memory address value associated with the object, and identifying a first synchronization construct that is suitable for use in granting access to the object. The synchronization construct is arranged to be identified using at least part of the memory address value. The method also includes determining when the first synchronization construct is available to be acquired, e.g., by a thread, and associating the first synchronization construct with the object when the first synchronization construct is available. In one embodiment, the first synchronization construct is a non-nestable, global lock.

25 Claims, 8 Drawing Sheets

METHOD AND APPARATUS FOR LOCKING OBJECTS USING SHARED LOCKS

CROSS REFERENCE TO A RELATED APPLICATION

This application takes priority from U.S. Provisional Patent Application No. 60/208,026 filed on May 30, 2000 naming Dean R. E. Long as inventor and assigned to the assignee of the present application and incorporated herein by reference in its entirety for all purposes.

BACKGROUND OF THE INVENTION

1. Field of Invention

The present invention relates generally to methods and apparatus for locking objects. More particularly, the present invention relates to methods and apparatus for locking objects that enable virtual and/or logical object locks to be mapped to global locks.

2. Description of the Related Art

An object that is suitable for use in an object-based environment generally includes a set of operations and a state that effectively remembers the effect of the operations. Since an object has at least some memory capability, an object differs from a function, which has substantially no memory capability. For example, a value returned by an operation associated with an object is dependent upon the state of the object as well as the arguments to the operation. As such, each invocation of an object may have a different result. In contrast, a value returned by a function is typically dependent only on the arguments to the function.

Within an object-based environment, threads are often used to satisfy requests for services. A thread may be thought of as a "sketch pad" of storage resources, and is essentially a single sequential flow of control within a computer program. In general, a thread, or a "thread of control," is a sequence of central processing unit (CPU) instructions or programming language statements that may be independently executed. Each thread has its own execution stack on which method activations reside. As will be appreciated by those skilled in the art, when a method is activated with respect to a thread, an activation is "pushed" on the execution stack of the thread. When the method returns, or is deactivated, the activation is "popped" from the execution stack. Since an activation of one method may activate another method, an execution stack operates in a first-in-last-out manner.

In some object-based environments, only one thread is allowed to invoke one of some number of operations, i.e., synchronized operations, that involve a particular object at any given time. Synchronization constructs such as locks, mutexes, semaphores, and monitors are often used to control access to shared resources, e.g., objects, such that only a single thread may invoke operations on a shared object at any given time. By way of example, in order to prevent more than one thread from operating on an object at any particular time, objects are often provided with locks. The locks are arranged such that only the thread that has possession of the lock for an object is permitted to execute a method on that object.

Figure 1A:
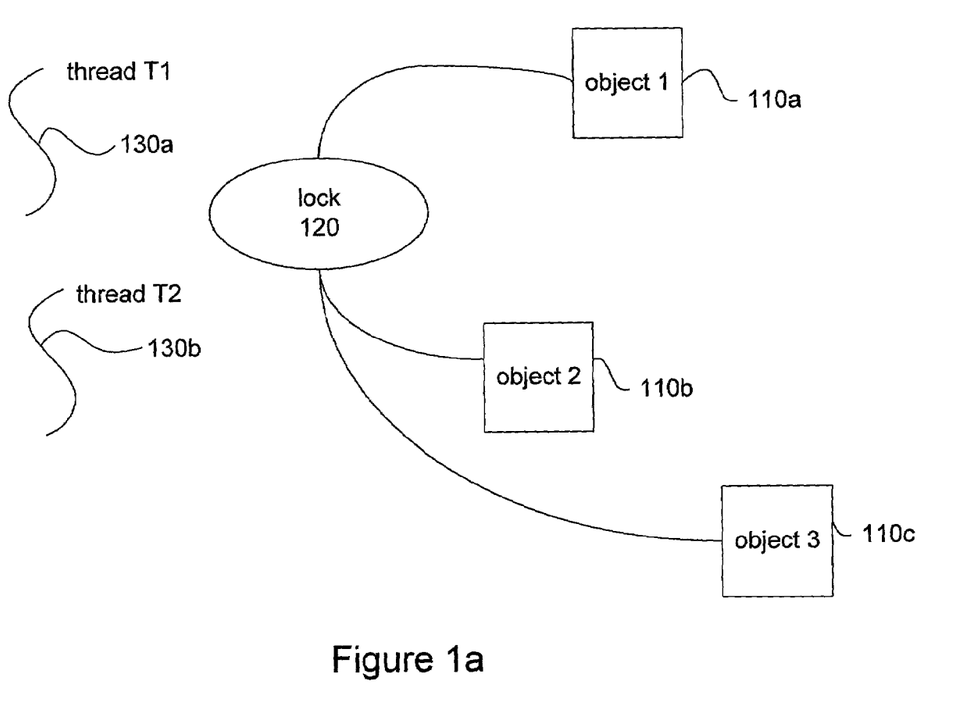
FIG. 1a is a diagrammatic representation of objects which share a global lock.

In general, locks are either global, i.e., shared by many objects, or individual, i.e., allocated separately to each object. FIG. 1a is a diagrammatic representation of an object-based system in which objects share a global lock. Objects 110 share a global lock 120 such that substantially only one of objects 110 may be invoked upon by a thread 130 at any given time. By way of example, when thread 130a attempts to gain access to object 110a, thread 130a must first obtain global lock 120 to "lock" object 110a. Thread 130a may only obtain global lock 120 when no other thread, e.g., thread 130b, has possession of global lock 120. Once thread 130a has possession of global lock 120 such that object 110a is locked, if thread 130b wishes to lock any object, e.g., object 110a or object 110b, then thread 130b must wait until thread 130a relinquishes global lock 120. In a system with only one global lock 120, only one object 110a may be locked at any given time.

Figure 1B:
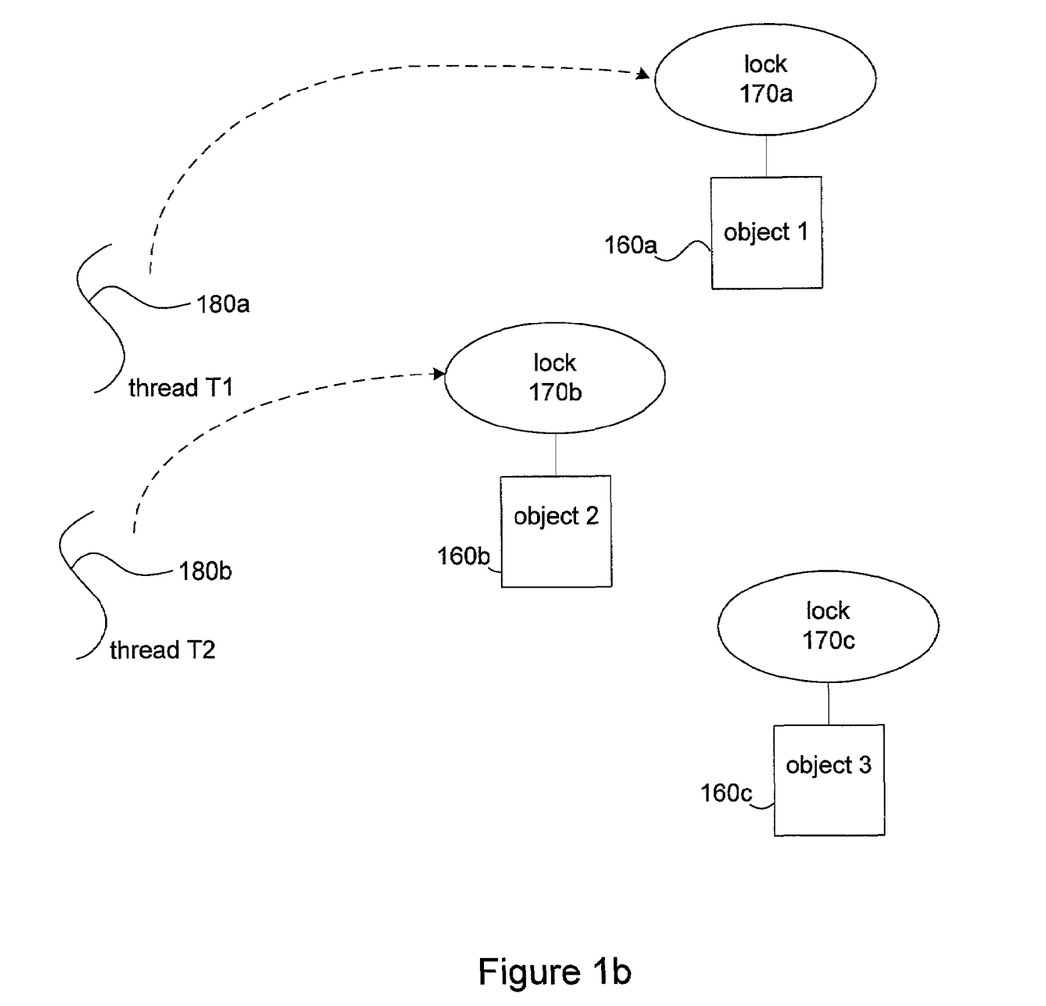
FIG. 1b is a diagrammatic representation of objects which have individual locks.

FIG. 1b is a diagrammatic representation of an object-based system in which each object in the system has its own lock. Objects 160 each have an associated lock 170a. Hence, more than one object 160 may be locked by threads 180 at any given time. That is, different threads 180 may hold locks to different objects 160 at substantially the same time. For example, thread 180a may obtain lock 170a and, hence, lock object 160a while thread 180b has possession of lock 170b and, therefore, access to object 160b. However, if either thread 180a wishes to obtain lock 170b on object 160b, then thread 180a must wait for thread 190b to relinquish control of object 160b.

When an object-based system includes only a single global lock, the contention for that global lock may be high. When contention for a global lock is high, threads may be slowed from gaining access to objects using the lock, and the performance of the overall system may be degraded. Alternatively, allocating a lock per object may be expensive in terms of memory consumption, as locks may be a scarce computational resource.

Therefore, what is needed is an efficient and inexpensive method for allocating locks. That is, what is desired is a method for associating objects with locks or mapping objects to locks that is scaleable to accommodate memory requirements and performance requirements.

SUMMARY OF THE INVENTION

The present invention relates to methods and apparatus for a scaleable locking convention. According to one aspect of the present invention, a method for acquiring access to an object in an object-based system includes identifying a memory address value associated with the object, and identifying a first synchronization construct that is suitable for use in granting access to the object. The synchronization construct is arranged to be identified using at least part of the memory address value. The method also includes determining when the first synchronization construct is available to be acquired, e.g., by a thread, and associating the first synchronization construct with the object when the first synchronization construct is available. In one embodiment, the first synchronization construct is a non-nestable, global lock.

In another embodiment, identifying the first synchronization construct includes indexing into a data structure using at least part of the memory address value. The data structure may be arranged to associate a plurality of synchronization constructs with information relating to address locations in the object-based system. The plurality of synchronization constructs includes the first synchronization construct, and at least one of the synchronization constructs is associated with more than one address location. In such an embodiment, indexing into the data structure using at least part of the memory address value includes indexing into the data structure using a hash value of the memory address associated with the object.

In accordance with another aspect of the present invention, an object-based computing system includes a memory with a plurality of address locations, at least one thread, and a plurality of objects. The plurality of objects includes at least one object which is accessible to the thread. Further, each of the objects is associated with a corresponding address of the address locations. The system also includes at least one lock that is accessible to the object, as well as a data structure that is arranged to associate the lock with at least one corresponding address location. The data structure is also arranged to be accessed by the thread using a first value associated with the object in order to identify the associated lock. In one embodiment, the system also includes a hashing mechanism arranged to create a hash value using information associated with the object. In such an embodiment, the first value is the hash value.

According to still another aspect of the present invention, a data structure for use in a multi-threaded, object-based computing system includes a plurality of index values and a plurality of lock identifiers. Each lock identifier is arranged to identify an associated lock in the computing system. Additionally, the lock identifiers are each associated with corresponding index values. In one embodiment, at least one lock identifier is associated with more than one index value included in the plurality of index value. In another embodiment, the index values are hash values of address locations associated with the computing system.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which.

DETAILED DESCRIPTION OF THE EMBODIMENTS

Broadly speaking, the invention relates to an implementation of non-nestable object locks that have scaleable characteristics that enables a trade-off to be made between performance and memory usage. The invention can be implemented in numerous ways, including as a method, a computer system, and an apparatus. Several embodiments of the invention are discussed below.

Object-based systems generally include objects that may be locked by threads. In order to lock an object, a thread must gain access to either a global lock or a lock that is specifically allocated to the object. Whether the thread obtains a global lock or a specifically allocated lock generally depends on the configuration of the overall system. When an object-based system includes only a global lock, the contention for that global lock may be high, as substantially every thread that is attempting to lock an object must acquire the global lock. Hence, individual threads may be slowed from gaining access to objects, and the performance of the overall system may be degraded. Allocating a lock per object, however, is often expensive in terms of memory consumption.

By effectively enabling global locks to be shared between objects, a compromise may be reached between reducing contention for locks and reducing memory consumption in an object-based system. A system in which multiple global locks are in existence may be considered to be scaleable. That is, the number of global locks may be increased or decreased based upon overall system performance and memory requirements. For example, increasing the number of global locks in a system may increase memory consumption while decreasing contention for the global locks. Conversely, decreasing the number of global locks may decrease memory consumption while increasing contention for the global locks.

In one embodiment, each object may be mapped to a particular global lock. It should be appreciated that, generally, a single global lock may be mapped to more than one object. The mapping may be accomplished using a hashing function, although such a mapping may be accomplished in substantially any suitable manner. Using a hashing function or operation to map an object to a lock may involve, for example, hashing an object pointer or an object reference and using the hashed value as a lock identifier.

A data structure, e.g., a hash table, may be used to facilitate the identification of which global lock is associated with a particular object. For instance, substantially all locks in a system may be listed in a hash table with an index that corresponds to hash values of addresses within the memory space of a system. For example, hash values of addresses within a certain range of address locations may correspond to a particular lock. When a thread attempts to lock an object, that thread may cause a hash value of the object (such as, for example, a hash value of an object pointer of the object) to be determined. The determined hash value may then be used as an index into the hash table to identify the lock that is suitable for use with the object.

In other cases, a simple array may instead be used to facilitate the identification of a suitable global lock for an object. When a simple array is used, an index is implicit in the address of the array element. The use of an array is facilitated by reducing the range of index values to fit into an array range. By way of example, when a hash function used on an address returns a value in the range of approximately zero to sixty-four kilobytes, and such a range exceeds the range of the array, then the hash function may be modified if the results of the hash function may be further reduced.

The implementation of non-nestable object locks that have scaleable characteristics enables a trade-off to be made between performance and memory usage. The overall balance between contention for shared global locks and memory allocated to the locks may be scaled as appropriate by altering the number of global locks reserved for objects. By increasing the number of global locks, contention for locks may be decreased while memory usage may be increased. Conversely, decreasing the number of global locks decreases memory usage while increasing contention for locks. The present invention enables performance issues to be weighed against memory issues to better meet the requirements of a particular system.

Figure 2:
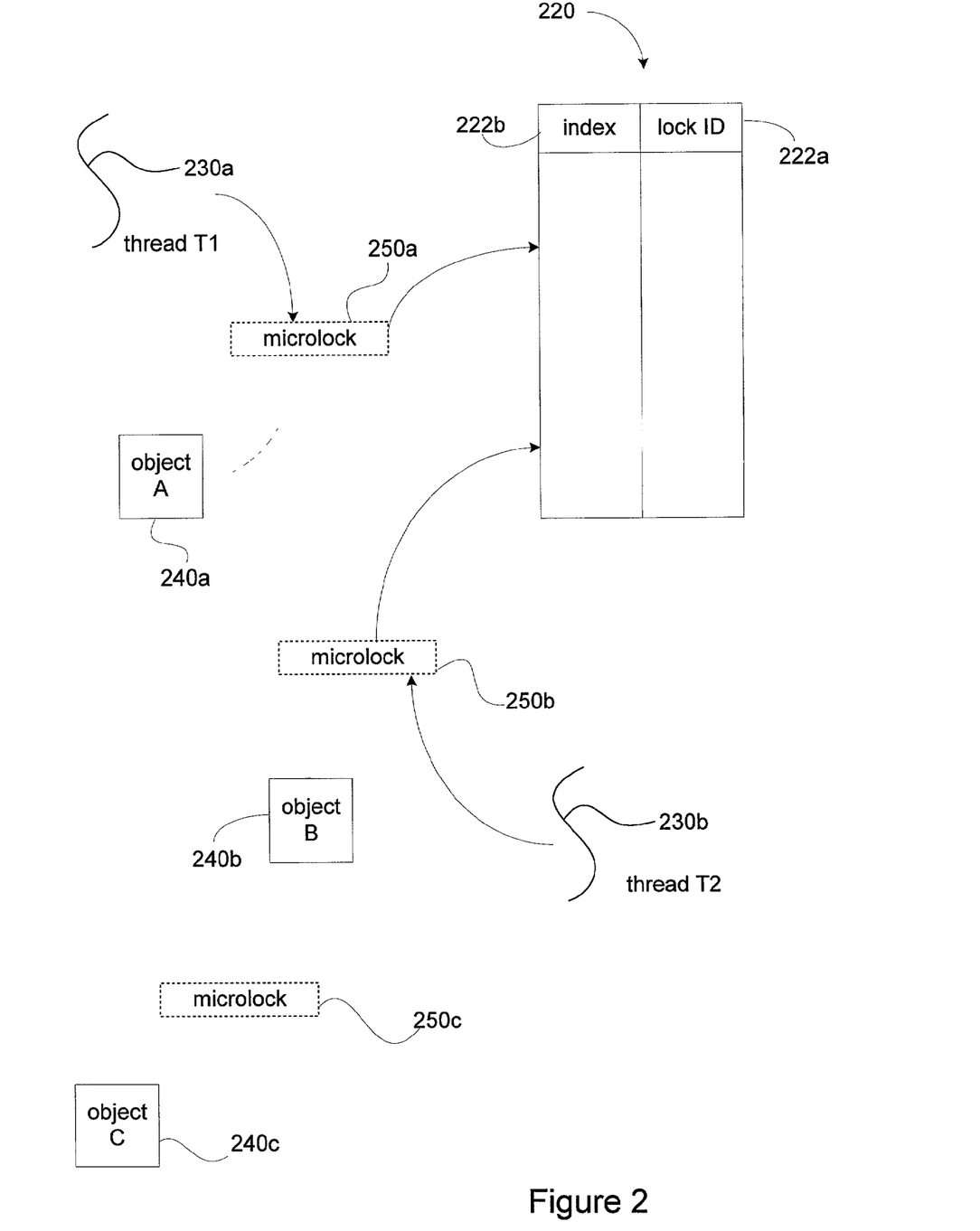
FIG. 2 is a diagrammatic representation of a data structure which indexes locks using hash values in accordance with an embodiment of the present invention.

FIG. 2 is a diagrammatic representation of a data structure that effectively lists locks using indexes that correspond to address values in accordance with an embodiment of the present invention. A data structure 220, such as, for example a hash table, includes lock identifiers 222a and indexes 222b. Lock identifiers 222a are arranged to identify global locks (not shown) which are suitable for enabling threads 230 to lock objects 240. Lock identifiers 222a and, hence, locks, are listed according to indexes 222b. As mentioned above, indexes 222 may be hashed values that correspond to address locations within an overall system.

In general, a single lock identifier 222a may correspond to more than one index 222b. The number of indexes 222b that correspond to lock identifiers 222a may vary depending upon the number of locks in a system. That is, since the number of locks is scaleable, the number of indexes 222b and, hence, objects 240, that are mapped to a particular lock may vary. Further, the number of objects 240 mapped to a lock may also vary depending upon the characteristics of the system. By way of example, if objects 240 in particular address locations are statistically determined not to be frequently locked, then those objects 240 may all be mapped to a particular lock.

When a thread 230 attempts to lock an object 240, the thread effectively invokes a microlock "operation" 250 associated with the object. The microlock operation 250 may be considered as being a virtual or logical lock. Invoking the microlock operation 250 may cause a hash value for an object 240 to be created and used to identify an actual lock. In the described embodiment, when a thread, e.g., thread 230a, is attempting to lock an object 240, (such as object 240a) thread 230a invokes a microlock operation 250, (such as microlock operation 250a) to obtain a hash value for object 240a. The hashed value for object 240a, which may be, in one implementation, a hashed value of an object pointer for object 240a, is used as an index into data structure 220 to obtain the lock associated with the appropriate lock identifier 222a. If the lock associated with the identified lock identifier 222a is available, then thread 230a obtains the lock, and is considered as holding the microlock on object 240a.

Although data structure 220 may be created at substantially any time, data structure 220 is most often created when a virtual machine, as for example a Java™ virtual machine developed by Sun Microsystems, Inc., of Palo Alto, Calif., is initialized. In one embodiment, data structure 220 may be reinitialized each time a virtual machine is reinitialized.

Figure 3:
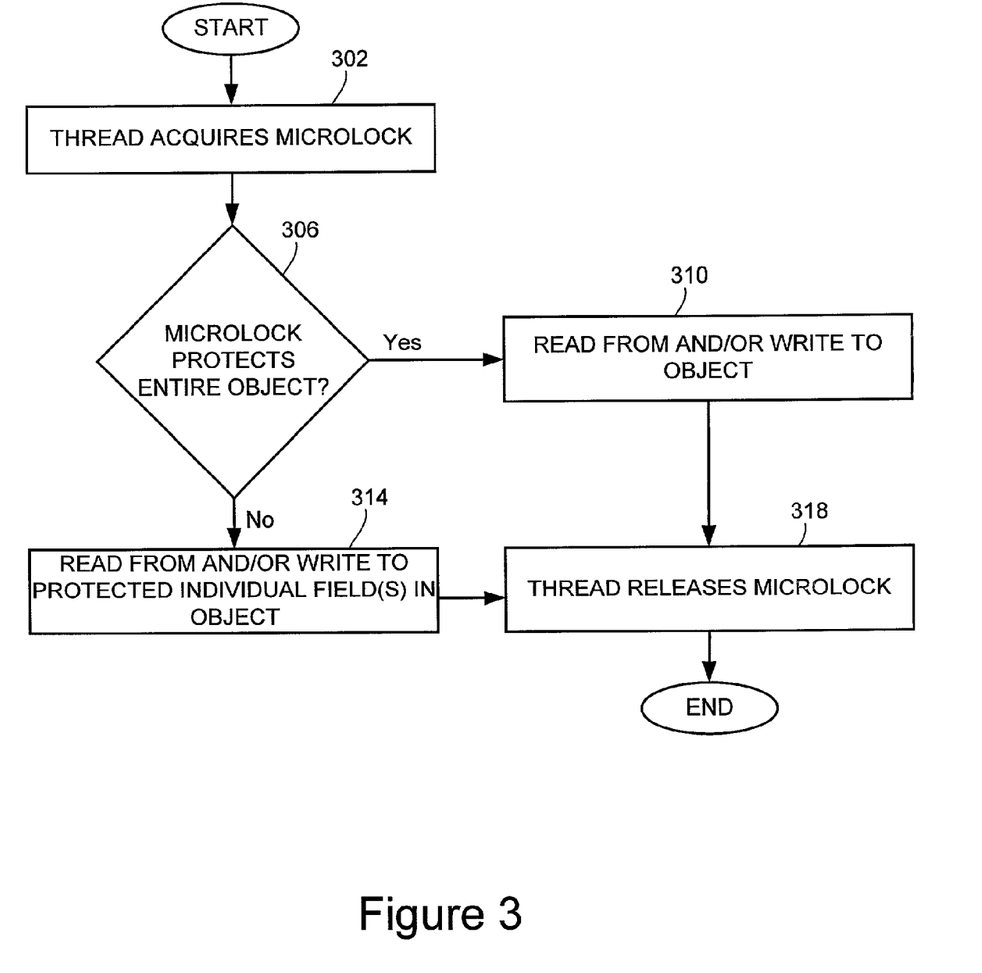
FIG. 3 is a process flow diagram which illustrates the steps associated with operating on an object using a microlock in accordance with an embodiment of the present invention.

With reference to FIG. 3, the steps associated with operating on an object using a microlock convention will be described in accordance with an embodiment of the present invention. A locking process begins at step 302 in which a thread which wishes to lock a particular object acquires the microlock to the object. Although the steps associated with acquiring the microlock to an object may vary, one suitable method of acquiring the microlock will be discussed below with respect to FIG. 4.

Once a thread acquires a microlock, then a determination is made in step 306 as to whether the microlock protects the entire object, i.e., the object which the thread has locked by acquiring the microlock. If it is determined that the microlock protects the entire object, once the thread has obtained the microlock, the thread is able to operate on substantially the entire object. Hence, process flow moves from step 306 to step 310 in which the thread reads from and/or writes to the object as appropriate. That is, the thread may read and modify substantially any field within object. When the thread has completed reading from or writing to the object as appropriate, the thread releases the microlock in step 318, and the process of operating on an object using a microlock convention is completed.

Returning to step 306, if it is determined that the microlock does not protect the entire object, then the microlock protects only a certain field or fields within the object. Accordingly, process flow proceeds to step 314 where the thread reads from and/or writes to certain, or individual, fields in the object which are accessible, i.e., which are protected by the microlock. After the thread has completed reading from and writing to the appropriate individual fields in the object, then the read releases the microlock in step 318.

Figure 4:
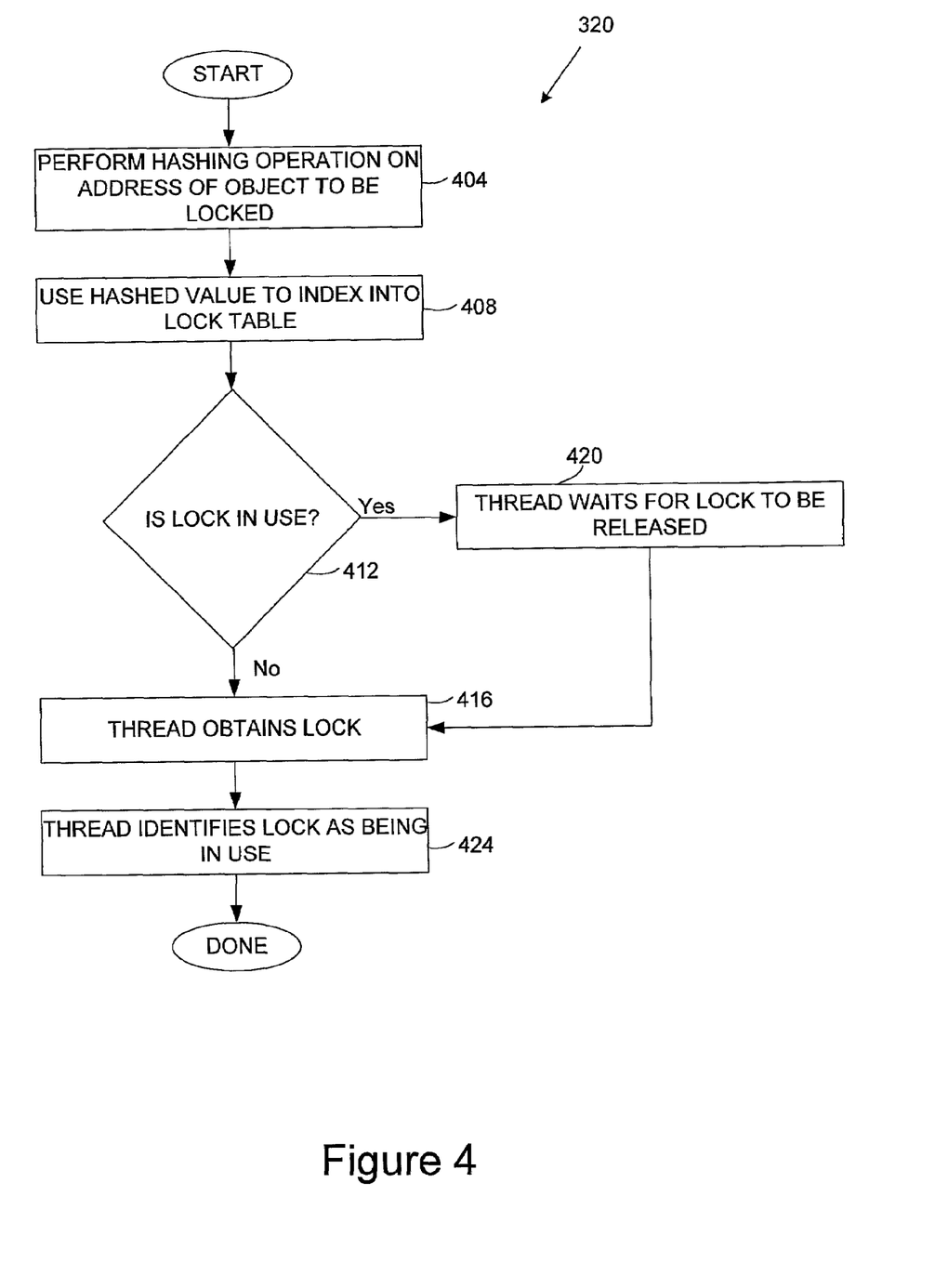
FIG. 4 is a process flow diagram which illustrates the steps associated with acquiring a microlock in accordance with an embodiment of the present invention.

As mentioned above, the steps associated with a thread acquiring a microlock may vary. Referring next to FIG. 4, one process of acquiring a microlock, i.e., step 302 of FIG. 3, will be described in accordance with an embodiment of the present invention. The process 302 begins at step 404 on which a hashing operation is performed on information associated with the object which is to be locked. In one embodiment, the information that is hashed may be the address of the object. Alternatively, the information may be an object pointer associated with the object. As will be understood by those skilled in the art, hashing may involve constructing a smaller value out of a larger value, e.g., constructing a 16-bit value from a 32-bit value.

The hashed value generated by the hashing operation is used to index into a lock table, e.g., lock table 220 of FIG. 2, in step 408. That is, the hashed value is used to identify a lock using a lock table. As previously described, index values within the lock table are used to identify locks with which they are associated. In the described embodiment, the index values within the lock table are hashed address values associated with objects. Hence, the hashed value generated by the hashing operation corresponds to the index value associated with a suitable lock.

In step 412, a determination is made as to whether the lock identified by the hashed value is in use. The determination of whether an identified lock is in use may vary widely. By way of example, when a lock is in use, its location in the lock table may effectively be replaced by a bit which identifies the lock as being used. Alternatively, the lock table may include a column of flags, which are set to indicate the availability of locks. When the lock table includes a column of flags, each lock has an associated flag which is set to indicate whether or not that lock is in use. In one embodiment, an assumption may be made that if a lock is being used, the thread that is attempting to acquire the lock will not proceed until the lock has been released.

If the determination is that the lock is not in use, then the thread obtains the lock in step 416. When the thread obtains the lock, i.e., the actual "physical" lock, then the thread is considered to be in possession of the microlock on the object, i.e., the virtual lock. While the thread, or the current thread, possesses the microlock of the object, then no other thread may obtain the microlock on the object. It should be appreciated that not even the current thread may "obtain" the microlock on the object once the current thread has already locked the object. Hence, in one embodiment, locks are non-nestable to essentially avoid problems associated with deadlock. When locks are non-nestable, a thread may not obtain a lock when it already has possession of a lock. Deadlock, as will be understood by those skilled in the art, may occur when a first thread holds the lock on a first object, and next requires that a second object be locked before relinquishing the lock on the first object, while a second thread holds the lock on the second object, and next requires that the first object be locked before relinquishing the lock on the second object.

After the thread obtains the lock in step 416, the thread identifies the lock as being in use in step 424. Identifying the lock as being in use, as for example in the lock table, enables other threads which attempt to obtain the lock to determine that the lock is not available. In one embodiment, identifying that the lock is in use may include setting a flag in the lock table to indicate that the lock is in use. Alternatively, identifying that the lock is in use may include placing a thread identifier in the lock table to identify the thread that possesses the lock. It should be understood that when the lock is associated with more than one object, i.e., that more than one object is mapped to the lock, each location in the lock table that corresponds to the lock may be updated to indicate that the lock is in use. Once the lock is identified as being in use, then the process of acquiring a microlock is complete.

Returning to step 412, if it is determined that the lock is in use, then the implication is that the thread may not acquire the lock. Accordingly, process flow moves to step 420 where the thread awaits the release of the lock. The steps associated with the thread awaiting release of the lock will be described below with respect to FIG. 5. Once the lock associated with the object that the thread is attempting to lock becomes available, then the thread obtains the lock in step 416.

Figure 5:
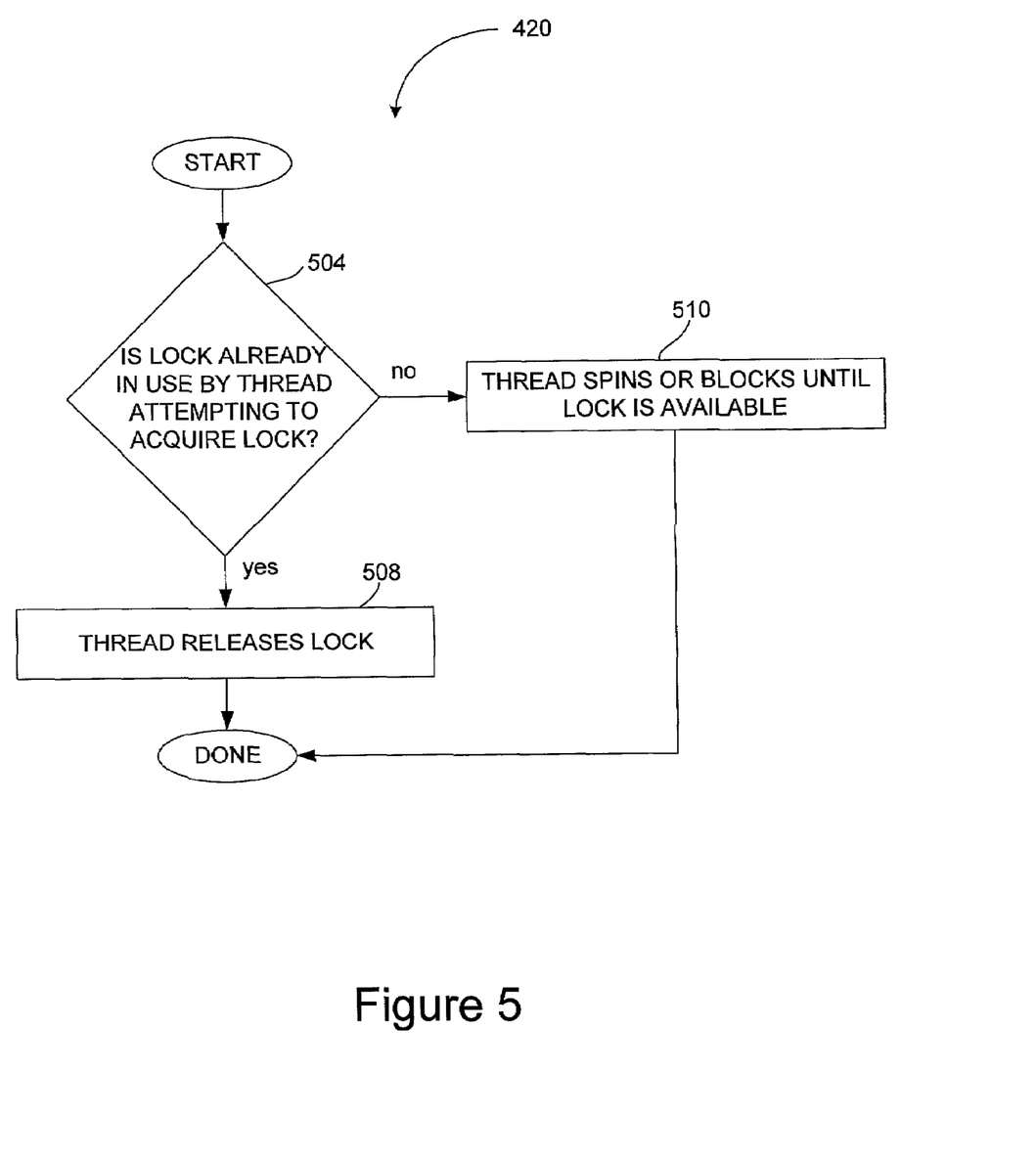
FIG. 5 is a process flow diagram which illustrates the steps associated with a thread waiting for release of an actual lock in accordance with an embodiment of the present invention.

In general, the actions of a thread while it awaits the availability of a lock may vary depending upon the requirements of a particular system, e.g., computer system which includes the thread. That is, what a thread does while it waits for a lock to be released may vary widely. FIG. 5 is a process flow diagram which illustrates the steps associated with actions which are undertaken while a thread waits for release of an actual lock, i.e., step 420 of FIG. 4, in accordance with an embodiment of the present invention. A process 420 begins at step 504 with a determination of whether the lock is already in use by the thread which is attempting to acquire the lock, i.e., the current thread. Such a determination may be made, for example, by checking appropriate entries in the lock table.

As will be understood by those skilled in the art, a thread may require that an already locked object to be relocked, before the object is unlocked. However, in the described embodiment, in order to prevent nested object locking, the thread is essentially not allowed to relock a locked object. Instead, the thread releases the object lock to enable the thread to once again obtain the object lock. Since nesting may cause deadlock, e.g., if a first thread locks two objects and a second thread locks two other objects while some of the objects map to the same global lock, preventing nesting allows a lock to be used safely. Accordingly, when the object is locked by the current thread, the current thread releases the lock in step 508, and the actions which are undertaken while the thread awaits release of the lock are completed.

Alternatively, when it is determined in step 504 that the lock is not already in use by the current thread, then the indication is that the lock is held by another thread, and process flow moves to step 512 in which the thread either spins or blocks itself until the lock becomes available. If the thread spins until the lock is available, then the thread effectively continues to check the availability of the thread, e.g., by checking a flag value in the lock table. When the lock becomes available, then the actions which are undertaken while the thread awaits release of the lock are completed.

Figure 6:
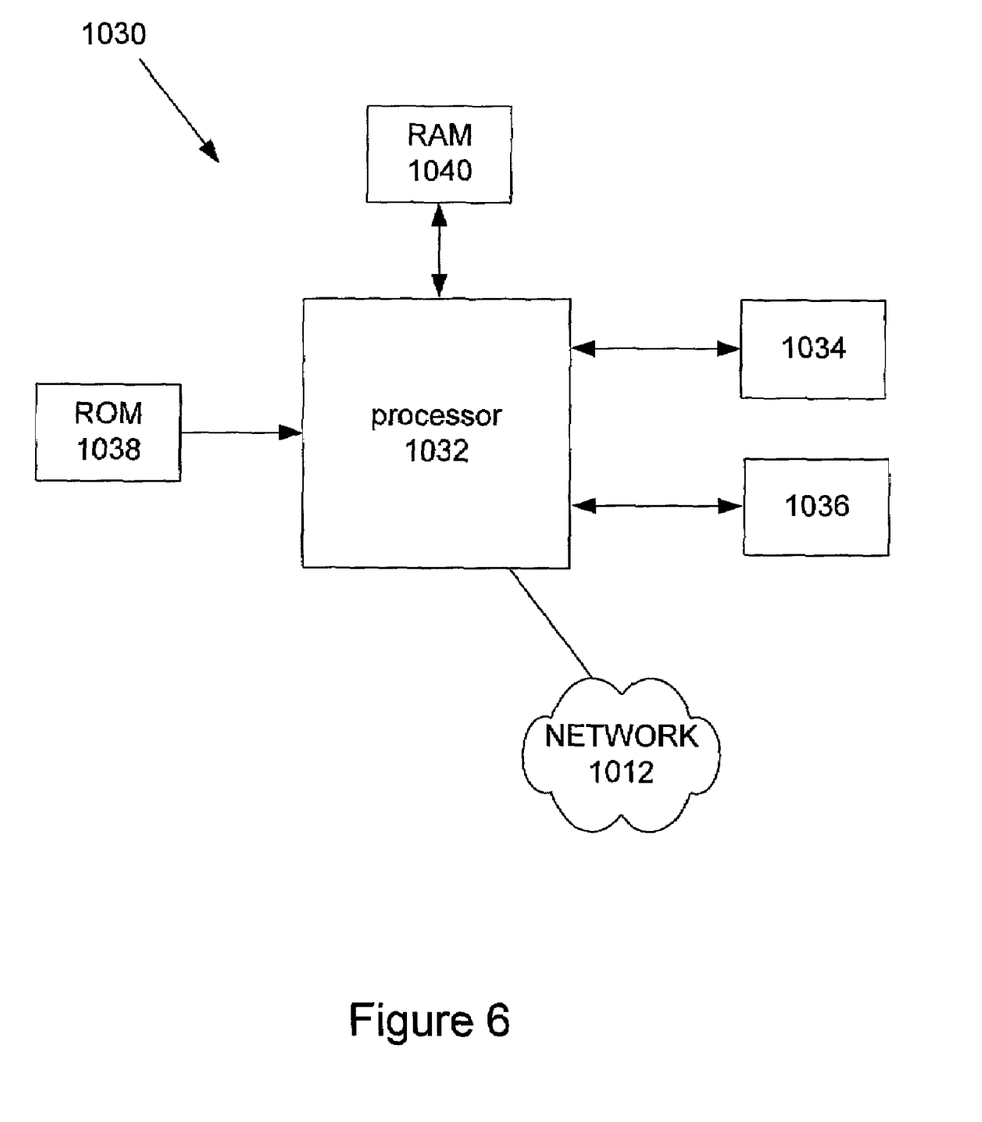
FIG. 6 is a diagrammatic representation of a general-purpose computer system suitable for implementing the present invention.

FIG. 6 illustrates a typical, general-purpose computer system suitable for implementing the present invention. The computer system 1030 includes at least one processor 1032 (also referred to as a central processing unit, or CPU) that is coupled to memory devices including primary storage devices 1036 (typically a read only memory, or ROM) and primary storage devices 1034 (typically a random access memory, or RAM).

Computer system 1030 or, more specifically, CPUs 1032, may be arranged to support a virtual machine, as will be appreciated by those skilled in the art. One example of a virtual machine that may be supported on computer system 1030 will be described below with reference to FIG. 7. As is well known in the art, ROM acts to transfer data and instructions uni-directionally to the CPUs 1032, while RAM is used typically to transfer data and instructions in a bi-directional manner. CPUs 1032 may generally include any number of processors. Both primary storage devices 1034, 1036 may include any suitable computer-readable media. A secondary storage medium 1038, which is typically a mass memory device, is also coupled bi-directionally to CPUs 1032 and provides additional data storage capacity. The mass memory device 1038 is a computer-readable medium that may be used to store programs including computer code, data, and the like. Typically, mass memory device 1038 is a storage medium such as a hard disk or a tape which generally slower than primary storage devices 1034, 1036. Mass memory storage device 1038 may take the form of a magnetic or paper tape reader or some other well-known device. It will be appreciated that the information retained within the mass memory device 1038, may, in appropriate cases, be incorporated in standard fashion as part of RAM 1036 as virtual memory. A specific primary storage device 1034 such as a CD-ROM may also pass data uni-directionally to the CPUs 1032.

CPUs 1032 are also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 1032 optionally may be coupled to a computer or telecommunications network, e.g., an internet network or an intranet network, using a network connection as shown generally at 1012. With such a network connection, it is contemplated that the CPUs 1032 might receive information from the network, or might output information to the network in the course of performing the above-described method steps. Such information, which is often represented as a sequence of instructions to be executed using CPUs 1032, may be received from and outputted to the network, for example, in the form of a computer data signal embodied in a carrier wave. The above-described devices and materials will be familiar to those of skill in the computer hardware and software arts.

Figure 7:
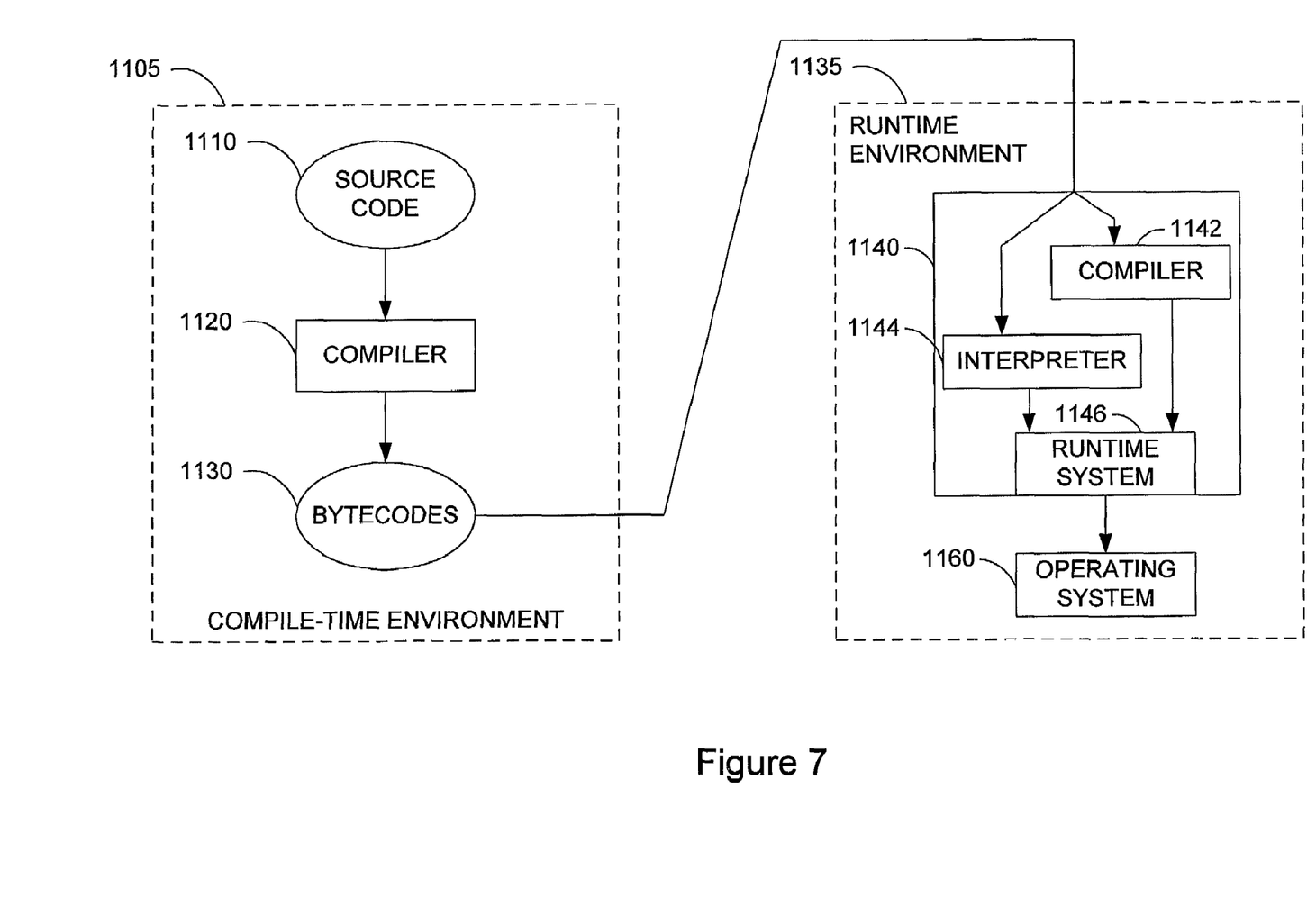
FIG. 7 is a diagrammatic representation of a virtual machine suitable for implementing the present invention.

As previously mentioned, a virtual machine may execute on computer system 1030. FIG. 7 is a diagrammatic representation of a virtual machine which is supported by computer system 1030 of FIG. 6, and is suitable for implementing the present invention. When a computer program, e.g., a computer program written in the Java™ programming language, is executed, source code 1110 is provided to a compiler 1120 within compile-time environment 1105. Compiler 1120 translates source code 1110 into bytecodes 1130. In general, source code 1110 is translated into bytecodes 1130 at the time source code 1110 is created by a software developer.

Bytecodes 1130 may generally be reproduced, downloaded, or otherwise distributed through a network, e.g., network 1012 of FIG. 6, or stored on a storage device such as primary storage 1034 of FIG. 6. In the described embodiment, bytecodes 1130 are platform independent. That is, bytecodes 1130 may be executed on substantially any computer system that is running on a suitable virtual machine 1140.

Bytecodes 1130 are provided to a runtime environment 1135 which includes virtual machine 1140. Runtime environment 1135 may generally be executed using a processor or processors such as CPUs 1032 of FIG. 5. Virtual machine 1140 includes a compiler 1142, an interpreter 1144, and a runtime system 1146. Bytecodes 1130 may be provided either to compiler 1142 or interpreter 1144.

When bytecodes 1130 are provided to compiler 1142, methods contained in bytecodes 1130 are compiled into machine instructions. In one embodiment, compiler 1142 is a just-in-time compiler which delays the compilation of methods contained in bytecodes 1130 until the methods are about to be executed. When bytecodes 1130 are provided to interpreter 1144, bytecodes 1130 are read into interpreter 1144 one bytecode at a time. Interpreter 1144 then performs the operation defined by each bytecode as each bytecode is read into interpreter 1144. That is, interpreter 1144 "interprets" bytecodes 1130, as will be appreciated by those skilled in the art. In general, interpreter 1144 processes bytecodes 1130 and performs operations associated with bytecodes 1130 substantially continuously.

When a method is invoked by another method, or is invoked from runtime environment 1135, if the method is interpreted, runtime system 1146 may obtain the method from runtime environment 1135 in the form of a sequence of bytecodes 1130, which may be directly executed by interpreter 1144. If, on the other hand, the method which is invoked is a compiled method which has not been compiled, runtime system 1146 also obtains the method from runtime environment 1135 in the form of a sequence of bytecodes 1130, then may go on to activate compiler 1142. Compiler 1142 then generates machine instructions from bytecodes 1130, and the resulting machine-language instructions may be executed directly by CPUs 1032. In general, the machine-language instructions are discarded when virtual machine 1140 terminates. The operation of virtual machines or, more particularly, Java™ virtual machines, is described in more detail in *The Java™ Virtual Machine Specification* by Tim Lindholm and Frank Yellin (ISBN 0-201-63452-X), which is incorporated herein by reference.

Although only a few embodiments of the present invention have been described, it should be understood that the present invention may be embodied in many other specific forms without departing from the spirit or the scope of the present invention. By way of example, the present invention has been described in terms of locks which are obtained by threads in order for the threads to gain substantially exclusive access to the objects. It should be appreciated, however, that the present invention may be implemented with respect to substantially any synchronization construct including, but not limited to, a mutexes, semaphores, and monitors. That is, a table of substantially any suitable, global synchronization construct may be included in a table, and indexed by a hash value when a thread attempts to lock an object that is associated with the table.

While a lock table has been described as being a global lock table which contains information relating to substantially every lock within a system, in one embodiment, a system may have more than one lock table. In a system with more than one lock table, some objects may be mapped to one lock table, while other objects may be mapped to another table.

While a lock table has been described as being a hash table, it should be understood that a lock table may be substantially any type of table or, more generally, any type of data structure. Further, hashing is only one suitable method that may be incorporated in order to associate an object with a lock. In some embodiments, other suitable methods may be used to associate an object with a lock. Such methods may include, but are not limited to, the use of program logic to choose a global lock.

The hashing approach to identifying a suitable global lock for use with an object has been described as being used in a system in which locks are non-nestable. The use of non-nestable locks is suitable for effectively enabling problems associated with deadlock to be substantially avoided. The present invention, however, is not limited to use with locks that are non-nestable. In one embodiment, locks may be nested without departing from the spirit or the scope of the present invention. In the event that deadlock occurs in such an embodiment, deadlock may be corrected, as for example by assigning threads certain priorities with respect to accessing to locks. Alternatively, to allow object locks to be nestable, global locks may be reentrant such that the same thread may acquire a lock multiple times before releasing the lock. When global locks are reentrant, to prevent deadlock, only one thread within a system may be allowed to use nested locks at any given time, while other threads may only lock one object at a time.

The steps associated with the various processes of the present invention may generally be widely varied, e.g., individual steps may be altered. In addition, steps may be removed, added, and reordered. For instance, for an embodiment in which a thread may not attempt to relock an object which the thread already possesses the lock to, the steps in FIG. 5 that are associated with determining whether a thread already possesses a lock while attempting to effectively reobtain the lock may be eliminated.

As described above, bits may be added to or modified within a lock table to indicate whether a lock is available. In general, however, substantially any suitable method may be used to determine whether a lock that is associated with a lock table is already in use without departing from the spirit or the scope of the present invention. Therefore, the present examples are to be considered as illustrative and not restrictive, and the invention is not to be limited to the details given herein, but may be modified within the scope of the appended claims.

What is claimed is:

1. A method for acquiring access to an object in an object-based system, the method comprising:
   providing a thread that attempts to acquire access to an object;
   identifying a memory address value associated with the object;

identifying a first synchronization construct that is suitable for use in granting access to the object;

determining that the first synchronization construct is unavailable;

when it is determined that the first synchronization construct is unavailable, determining that the thread that is attempting to acquire access to the object is already associated with the object;

when it is determined that the thread is already associated with the object releasing the association such that the thread is not associated with the object.

2. A method for acquiring access to an object as recited in claim 1 wherein the first synchronization construct is identified using at least part of the memory address value, and wherein identifying a first synchronization construct that is suitable for granting access to the object includes:

indexing into a data structure using the at least part of the memory address value, the data structure being arranged to associate a plurality of synchronization constructs with information relating to address locations in the object-based system, the plurality of synchronization constructs including the first synchronization construct, wherein at least one of the plurality of synchronization constructs is associated with more than one address location.

3. A method for acquiring access to an object as recited in claim 2 wherein identifying a first synchronization construct that is suitable for use granting access to the object further includes:

obtaining a hash value from the memory address value, wherein indexing into the data structure using the at least part of the memory address value includes indexing into the data structure using the hash value.

4. A method for acquiring access to an object as recited in claim 3 wherein the information relating to address locations includes hash values of the address locations and the data structure is a hash table.

5. A method for acquiring access to an object as recited in claim 4 wherein the first synchronization construct is a lock and at least one of the plurality of synchronization constructs is the lock, and associating the first synchronization construct with the object includes locking the object using the first synchronization construct.

6. A method for acquiring access to an object as recited in claim 1 wherein the first synchronization construct is a lock, and associating the first synchronization construct with the object includes locking the object using the first synchronization construct.

7. A method for acquiring access to an object as recited in claim 6 wherein the lock is a non-nestable, global lock.

8. An object-based computing system, the object-based computing system comprising:

a memory, the memory including a plurality of address locations;

at least one thread;

a plurality of objects, the plurality of objects including at least one object which is accessible to the at least one thread, wherein each of the plurality of objects is associated with a corresponding address of the plurality of address locations;

at least one lock, the at least one lock being accessible to the at least one object and being held by at least one locking thread, wherein the at least one lock can be released such that the object is not locked by any locking thread in response to a determination that the at least one locking thread is the same thread as the at least one thread; and a data structure, the data structure being arranged to associate the at least one lock with at least one corresponding address location selected from the plurality of address locations, wherein the data structure is arranged to be accessed by the at least one thread using a first value associated with the at least one object to identify the at least one lock.

9. An object-based computing system according to claim 8 further including:

a hashing mechanism, the hashing mechanism being arranged to create a hash value using information associated with the at least one object, wherein the first value is the hash value.

10. An object-based computing system according to claim 9 wherein the at least one corresponding address location is a hash value of the at least one corresponding address location.

11. A computer product for acquiring access to an object in an object-based system, the computer product comprising:

computer code for providing a thread that attempts to acquire access to an object;

computer code for identifying a memory address value associated with the object;

computer code for identifying a first synchronization construct that is suitable for use in granting access to the object, wherein the first synchronization construct is identified using at least part of the memory address value;

computer code for determining when the first synchronization construct is available;

computer code for, when the first synchronization construct is unavailable, determining whether the thread that is attempting to acquire access to the object is already associated with the object;

computer code for, when the thread that is attempting to acquire access to the object is already associated with the object, releasing the association such that the thread is not associated with the object;

computer code fur associating the first synchronization construct with the object when it is determined that the first synchronization construct is available; and a computer-readable medium that stores the computer codes.

12. A computer program product for acquiring access to an object as recited in claim 11 wherein the computer code for identifying a first synchronization construct that is suitable for granting access to the object includes:

computer code for indexing into a data structure using the at least part of the memory address value, the data structure being arranged to associate a plurality of synchronization constructs with information relating to address locations in the object-based system, the plurality of synchronization constructs including the first synchronization construct, wherein at least one of the plurality of synchronization constructs is associated with more than one address location.

13. A computer program product for acquiring access to an object as recited in claim 12 wherein the computer code for identifying a first synchronization construct that is suitable for use granting access to the object further includes:

computer code for obtaining a hash value from the memory address value, wherein the computer code indexing into the data structure using the at least part of the memory address value includes computer code for indexing into the data structure using the hash value.

14. A computer program product for acquiring access to an object as recited in claim 13 wherein the information relating to address locations includes hash values of the address locations, and the data structure is a hash table.

15. A computer program product for acquiring access to an object as recited in claim 14 wherein the first synchronization construct is a lock and the plurality of synchronization constructs are locks, and the computer code for associating the first synchronization construct with the object includes computer code for locking the object using the first synchronization construct.

16. A computer program product for acquiring access to an object as recited in claim 11 wherein the computer-readable medium is one selected from the group consisting of a hard disk, a floppy disk, a data signal embodied in a carrier wave, a tape drive, an optical drive, and a CD-ROM.

17. A data structure for use in a multi-threaded, object-based computing system, the data structure being arranged to be stored in a memory of the computing system, the data structure comprising:
    a plurality of index values; and
    a plurality of lock identifiers, each lock identifier included in the plurality of lock identifiers being arranged to identify an associated lock in the computing system, wherein the plurality of lock identifiers are associated with corresponding index values included in the plurality of index values;
    wherein the associated lock is held by a thread, and the associated lock can be released such that an object associated with the lock is not locked by any lock held by a thread in response to a determination that a requesting thread is also the thread that is holding the associated lock.

18. A data structure according to claim 17 wherein at least one look identifier included in the plurality of lock identifiers is associated with more than one index value included in the plurality of index values.

19. A data structure according to claim 18 wherein the data structure is arranged to be accessed by a thread using a value corresponding to a first index value included in the plurality of index values to identify a suitable lock for use in locking a first object included in the computing system.

20. A data structure according to claim 17 Wherein the plurality of index values are hash values of address locations associated with the computing system.

21. A computer-implemented method for acquiring access to an object in an object-based system, the method comprising:
    providing a thread that attempts to acquire access to an object;
    identifying a memory address value associated with the object;
    identifying a first synchronization construct that is suitable for use in granting access to the object;
    determining that the first synchronization construct is unavailable;
    when it is determined that the first synchronization construct is unavailable, determining that the thread that is attempting to acquire access to the object is already associated with the object; and
    when it is determined that the thread that is attempting to acquire access to the object is already associated with the object, releasing the association such that the thread is not associated with the object.

22. A computer program product for acquiring access to an object in an object-based system, the computer program product comprising:
    computer code for providing a thread that attempts to acquire access to an object;
    computer code for identifying a memory address value associated with the object;
    computer code for identifying a first synchronization construct that is suitable for use in granting access to the object, wherein the first synchronization construct is identified using at least part of the memory address value;
    computer code for determining whether the first synchronization construct is unavailable;
    computer code for, when it is determined that the first synchronization construct is unavailable, determining whether the thread that is attempting to acquire access to the object is already associated with the object;
    computer code for, when it is determined that the thread that is attempting to acquire access to the object is already associated with the object, releasing the association such that the thread is not associated with the object; and
    a computer-readable medium that stores the computer codes.

23. A method for acquiring access to an object as recited in claim 1, wherein determining that the first synchronization construct is unavailable includes determining that the first synchronization construct is in use.

24. A computer-implemented method for acquiring access to an object as recited in claim 21, wherein determining that the first synchronization construct is unavailable includes determining that the first synchronization construct is in use.

25. A computer program product according to claim 22 further comprising:
    computer code for, when it is determined that the first synchronization construct is available, associating the first synchronization construct with the object.

* * * * *

UNITED STATES PATENT AND TRADEMARK OFFICE
CERTIFICATE OF CORRECTION

PATENT NO. : 7,003,521 B2 Page 1 of 1
APPLICATION NO. : 09/816010
DATED : February 21, 2006
INVENTOR(S) : Dean R. E. Long It is certified that error appears in the above-identified patent and that said Letters Patent is hereby corrected as shown below:

In the Claims:

In line 23 of claim 11 (column 12, line 41) change "fur associating" to --for associating--.

In line 2 of claim 18 (column 13, line 35) change "look identifier" to --lock identifier--.

Signed and Sealed this

Twenty-eighth Day of November, 2006

JON W. DUDAS
*Director of the United States Patent and Trademark Office*